US008584897B2

(12) United States Patent
Belcham

(10) Patent No.: US 8,584,897 B2
(45) Date of Patent: Nov. 19, 2013

(54) SYSTEMS AND METHODS FOR PRODUCING A COOLING BEVERAGE

(75) Inventor: Robert David John Belcham, Sutton Coldfield (GB)

(73) Assignee: Scottish & Newcastle Limited, Edinburgh (GB)

( * ) Notice: Subject to any disclaimer, the term of this patent is extended or adjusted under 35 U.S.C. 154(b) by 612 days.

(21) Appl. No.: 12/678,924

(22) PCT Filed: Sep. 17, 2008

(86) PCT No.: PCT/GB2008/003150
§ 371 (c)(1),
(2), (4) Date: May 28, 2010

(87) PCT Pub. No.: WO2009/037446
PCT Pub. Date: Mar. 26, 2009

(65) Prior Publication Data
US 2010/0276444 A1 Nov. 4, 2010

(30) Foreign Application Priority Data
Sep. 18, 2007 (GB) .................................. 0718177.9

(51) Int. Cl.
*B67B 7/00* (2006.01)
*G01F 11/00* (2006.01)
*G01F 11/28* (2006.01)
*B67D 7/80* (2010.01)
*F25D 3/08* (2006.01)

(52) U.S. Cl.
USPC ......... 222/1; 222/146.1; 222/146.6; 222/424; 62/1

(58) Field of Classification Search
USPC ............ 222/146.1, 146.6, 424, 1, 144.5, 318; 62/1, 390, 391
See application file for complete search history.

(56) References Cited

U.S. PATENT DOCUMENTS 3,608,779 A * 9/1971 Cornelius ....................... 222/54
4,742,939 A * 5/1988 Galockin ........................ 222/68

(Continued)

FOREIGN PATENT DOCUMENTS

EP 1876137 A1 1/2008
GB 2194508 A 3/1988

(Continued)

OTHER PUBLICATIONS

British Search Report No. GB0718177.9 dated Jan. 17, 2008.

(Continued)

*Primary Examiner* — Paul R Durand
*Assistant Examiner* — Matthew Lembo
(74) *Attorney, Agent, or Firm* — Fleit Gibbons Gutman Bongini & Bianco PL; Martin Fleit; Paul D. Bianco

(57) ABSTRACT

A system for cooling a beverage and dispensing a beverage cooling medium comprises a beverage line connectable to a beverage supply for transporting beverage from the beverage supply through a conduit to a beverage dispense valve at a dispensation site, and a cooling line for transporting a cooling medium through the conduit so as to allow heat exchange between the cooling medium in the cooling line and the beverage in the beverage line. The cooling line is connectable to the beverage supply or to a second beverage supply such that the cooling medium is a beverage cooling medium. The system further comprises a cooling medium dispense valve in communication with the cooling line at the dispensation site for dispensing the beverage cooling medium. The system is further operative for dispensing a frozen particle-containing beverage through a python.

38 Claims, 7 Drawing Sheets

(56) References Cited

U.S. PATENT DOCUMENTS

| | | | | | |
|---|---|---|---|---|---|
| 4,793,515 | A * | 12/1988 | Shannon et al. | 222/69 |
| 4,964,542 | A * | 10/1990 | Smith | 222/146.6 |
| 5,228,312 | A * | 7/1993 | Williams | 62/390 |
| 6,324,850 | B1 | 12/2001 | Davis | |
| 6,609,391 | B2 * | 8/2003 | Davis | 62/393 |
| 6,928,824 | B2 * | 8/2005 | Hess et al. | 62/66 |
| 6,974,598 | B2 * | 12/2005 | Scullion et al. | 426/592 |
| 7,077,293 | B2 * | 7/2006 | McCann et al. | 222/129.1 |
| 7,080,525 | B2 * | 7/2006 | McCann et al. | 62/389 |
| 7,628,023 | B2 * | 12/2009 | Lucas | 62/98 |
| 7,785,641 | B2 * | 8/2010 | Scullion et al. | 426/66 |
| 2002/0083730 | A1 * | 7/2002 | Giroux et al. | 62/354 |
| 2006/0137383 | A1 * | 6/2006 | Chiusolo | 62/390 |
| 2006/0162370 | A1 * | 7/2006 | Haskayne | 62/390 |
| 2007/0022763 | A1 | 2/2007 | Moulder | |
| 2009/0077999 | A1 | 3/2009 | Chapman et al. | |

FOREIGN PATENT DOCUMENTS

| | | | |
|---|---|---|---|
| GB | 2358013 | A | 7/2001 |
| GB | 2401423 | A | 11/2004 |
| GB | 2417064 | A1 | 2/2006 |
| GB | 2417065 | A * | 2/2006 |
| GB | 2432354 | A | 5/2007 |
| GB | 2436445 | B | 7/2008 |
| GB | 2427673 | B | 2/2010 |
| WO | WO 2006032129 | A1 * | 3/2006 |

OTHER PUBLICATIONS

International Search Report published May 28, 2009 for PCT/GB2008/003150, filed Sep. 17, 2008.

Written Opinion of the International Searching Authority published Mar. 18, 2010 for PCT/GB2008/003150, filed Sep. 17, 2008.

International Preliminary Report on Patentability published Mar. 24, 2010 for International Application No. PCT/GB2008/003150, filed Sep. 17, 2008.

* cited by examiner

SYSTEMS AND METHODS FOR PRODUCING A COOLING BEVERAGE

The present invention relates to systems and methods for beverage cooling and dispensing.

Many beverages including beers, lagers and ciders are beneficially served at low temperatures. If the temperature of the beverage is too high, the quality and the taste of the beverage may be impaired. In addition, recent consumer trends have increased the demand for beverages to be served at a lower temperature, for example, below 3° C. In order to meet consumer expectations, it is desirable to dispense beverages at a consistent low temperature.

A particular problem has been found in dispensing draft beverages at low and consistent temperatures. By "draft beverages" is meant beverages which are stored at a point remote from the point of dispensation and transferred on demand to the point of dispensation through a beverage line. Typically the transfer is achieved using a pumping mechanism. For instance, it is common in public houses and bars for beverages to be stored in a cellar or a storage room and transferred to the bar area where dispensation occurs at a font using a mechanical hand pump or a gas pressurised system.

One problem that arises when dispensing draft beverages is that the length of the beverage line between the cellar/storage room and the dispensation site may be many meters and there is a tendency for beverage in the beverage lines to increase in temperature during transit. In an attempt to address this problem, it is known to provide a cooler in or near the cellar/storage room to cool the beverage and then to transport the beverage to the dispensation site inside an insulated and cooled conduit known as a "python". The cooler typically comprises an ice bank and a water bath, the water in the water bath being cooled by the ice bank. The beverage line passes from the cellar/storage room through the water bath and beverage contained in the beverage line is thus cooled. The cooled beverage then flows through the python to the dispensation site, the python also carrying a cooling circuit through which cold water from the water bath is circulated.

In an attempt to reduce the temperature of beverages even further and also to form ice/frost effects on the exterior of the font for aesthetic reasons, the use of a cooling medium such as a 30% glycol solution has been proposed. However, the high amount of glycol leads to a cooling medium which can have a temperature as low as −30° C. (although typically a glycol cooling medium will be used at a temperature of around −3° C.). Such a low temperature cooling medium can result in cooling of the beverage in the beverage line to below the filtration temperature leading to an irreversible formation of precipitates which cloud the beverage. In extreme cases, the low temperature can lead to freezing of the beverage in the beverage line.

It is also known to provide a system for dispensing a beverage comprising a liquid beverage portion and a frozen beverage portion. Such a beverage has an aesthetic appeal to consumers and the frozen beverage portion can help maintain the low temperature of the beverage in the glass without dilution.

An example of an apparatus for dispensing a beverage having a liquid portion and a frozen beverage portion is described in GB2432354. This apparatus is incorporated into a dispense font at a dispensation site and has a cooling chamber in which liquid beverage is frozen. A frozen beverage portion is ejected from the cooling chamber through a mesh or grate using a piston to form an ice slush which is dispensed into a glass along with the liquid beverage portion. This apparatus has numerous moving parts and is therefore prone to mechanical failure. Furthermore, this apparatus plays no part in cooling the liquid beverage portion before dispense and therefore some other means of cooling the liquid beverage portion must be provided.

It is a preferred aim of the present invention to provide alternative systems and methods for cooling a beverage in a beverage line which allow for a greater flexibility in dispensing options e.g. which allow dispense of a supercooled beverage or a beverage containing frozen beverage particles in addition to the dispense of cooled beverage from the beverage line.

In a first aspect, the present invention provides a system for cooling a beverage and dispensing a beverage cooling medium, the system comprising:

a beverage line connectable to a beverage supply for transporting beverage from the beverage supply through a conduit to a beverage dispense valve at a dispensation site; and a cooling line for transporting a cooling medium through the conduit so as to allow heat exchange between the cooling medium in the cooling line and the beverage in the beverage line;

wherein the cooling line is connectable to the beverage supply or to a second beverage supply such that the cooling medium is a beverage cooling medium; and wherein the system further comprises a cooling medium dispense valve in communication with the cooling line at the dispensation site for dispensing the beverage cooling medium.

By providing a cooling line which is connectable to the beverage supply or to a second beverage supply, beverage cooling medium can be used in the cooling line in the conduit (which is preferably an insulated conduit such as a python) to cool beverage in the beverage line through heat exchange as they pass through the python. The beverage cooling medium is preferably not water and is preferably a soft drink or alcoholic beverage medium. The ability to dispense the beverage cooling medium allows a flexible dispense system wherein beverage can be dispensed from the beverage dispense valve into a glass (with no beverage cooling medium), beverage cooling medium can be dispensed from the cooling medium dispense valve into a glass (with no beverage from the beverage line) or both beverage and beverage cooling medium can be dispensed into the same glass. This final dispense option allows continued cooling of the beverage by the beverage cooling medium after dispense, especially in instances where the beverage cooling medium is supercooled or contains frozen particles.

If it is intended for the beverage cooling medium to be dispensed into the same glass as the beverage, it is preferable for the cooling line to be connectable to the same beverage supply as the beverage line, for example they may both be connectable to a supply of alcoholic beverage e.g. keg/barrel of beer, lager or cider. In this way, the system allows dispense of beverage from the beverage line (through the beverage dispense valve) and dispense of the beverage cooling medium (which is the same as the beverage albeit at a lower temperature) into the same glass through the cooling medium dispense valve. If it is intended for the beverage cooling medium to be dispensed into a different glass from the beverage, the cooling line may be connectable to a second beverage supply so that the beverage in the beverage line may be, for example, beer whilst the beverage cooling medium may be, for example, cider.

Preferably, the system further comprises a cooling return line for transporting beverage cooling medium away from the dispensation site when the cooling medium dispense valve is closed. Thus the cooling line and return line preferably form a cooling circuit around which the beverage cooling medium is constantly pumped to maximise its cooling effect on the beverage line(s) in the conduit.

Preferably, the system includes an insulated conduit of the type known as a "python" which comprises a tubular sleeve formed of insulating plastics material. The length of the python is unlimited but, typically, will be between 3 and 300 meters. A length of around 30 meters is most typical. The cooling line and (optionally) the return cooling line preferably pass through the python close to its axial centre with the beverage line running coaxially with the cooling/cooling return lines. Alternatively, one or both of the cooling line and cooling return line could be off-set from the axial centre of the python.

The beverage line may be formed predominantly of standard piping e.g. 9.5 mm (⅜") o.d. piping. There may be more than one beverage line, each line being connectable to its respective beverage supply and extending through the conduit/python to the dispensation site.

The cooling line and cooling return line typically have a larger bore than the beverage line(s). The cooling line and cooling return line typically have an outer diameter of 15 mm. However, the cooling line and cooling return line could also have a bore size comparable to that of the beverage line(s) e.g. they could have an outer diameter of around 9.5 mm (⅜").

In especially preferred embodiments the cooling return line passes through a heat exchanger. The heat exchanger may be adapted to withdraw heat energy from any beverage cooling medium in the cooling return line. This reduces/maintains the low temperature of the beverage cooling medium. The cooling return line can then pass back through the python (in the opposite direction to the cooling line) where it can have a further cooling effect on the beverage line.

Alternatively, the heat exchanger may be adapted to apply heat energy from any beverage cooling medium in the return cooling line. In this case, the application of heat energy may result in warming of the beverage cooling medium or it may result in at least partial defrosting of any frozen particles of beverage in the beverage cooling medium.

Preferably, the system includes means for cooling the beverage cooling medium to below its freezing point at ambient atmospheric pressure. This provides a cooling medium which will be colder than the water cooling medium used in some known systems but which will not be as cold as the glycol cooling medium used in other known systems. This will result in effective cooling of the beverage in the beverage line without any risk of freezing.

To effect this cooling of the beverage cooling medium, preferred embodiments of the system comprise a freezer apparatus in communication with the cooling line for generating a beverage cooling medium containing particles of frozen beverage. The freezer apparatus may be a scraped cylinder slush ice generator. Such a generator includes a refrigeration unit which cools a wetted surface which is continuously scraped to form a two phase mixture of small frozen particles suspended in liquid beverage cooling medium. The volume fraction of the frozen particles can be varied such that the beverage cooling medium may be a free-flowing liquid suspending frozen beverage particles or it may have a slush consistency. Preferably, the volume fraction of frozen particles is between 1% and 20%; such a mixture is easily pumpable through the cooling line. However, the volume fraction of frozen particles could be up to 40%.

Alternative embodiments of the system comprise a cooling apparatus adapted to supercool the beverage cooling medium i.e. to cool the beverage cooling medium to below its freezing point at ambient atmospheric pressure without freezing the beverage cooling medium. This may be achieved, for example, by cooling the beverage cooling medium at a pressure greater than ambient atmospheric pressure. For example, the cooling apparatus may comprise a chiller and a cooling medium pressurizer. In these embodiments, the system further will further comprise a pressure reducer (e.g. a flow restrictor) at or adjacent the cooling medium dispense valve to avoid frothing of the beverage cooling medium when it is dispensed from the cooling medium dispense valve.

The system may further comprise a cooling medium reservoir for containing beverage cooling medium generated by the freezer apparatus or cooling apparatus. The reservoir is preferably insulated and may be remote from the freezer/cooling apparatus. It may contain an agitator or a static in-line mixing device. The reservoir allows the system to damp out demand fluctuations and thus enables the freezer/cooling apparatus to be sized for the mean load rather than the peak load. The reservoir may be fed by the freezer/cooling apparatus, i.e. the reservoir stores beverage cooling medium prior to its passage through the cooling line but, preferably, the reservoir is fed by the return cooling line, i.e. the reservoir stores beverage cooling medium after its passage through the cooling line and return cooling line.

The beverage line preferably includes a beverage line portion passing through the reservoir so that the beverage in the beverage line is cooled by heat exchange with the beverage cooling medium prior to passing through the conduit/python. Preferably, the beverage line portion is a coiled portion which can be immersed in the beverage cooling medium in the reservoir. The amount of coil immersed can be varied to determine the extent of heat exchange and hence the extent of cooling of the beverage in the beverage line portion. If no cooling medium reservoir is provided, the beverage line portion may pass through a chiller such as an ice bank/water bath chiller.

The system may include a secondary cooler at or near the dispensation site (although it may be provided at any point between the point of connection of the beverage line to the beverage supply and the dispensation site). The secondary cooler may be a passive heat exchanger which, preferably, can be flooded with beverage cooling medium from the cooling line. The passive heat exchanger preferably includes a cooling coil through which the beverage from the beverage line can flow to allow heat exchange between the beverage in the cooling coil and the beverage cooling medium. Most preferably, the passive heat exchanger is as described in GB2417064.

Preferably, the beverage dispense valve is provided on a dispense font at the dispensation site. Most preferably, the dispense font comprises a cooling loop formed of the cooling line or the return cooling line for cooling/maintaining the temperature of the beverage by heat exchange between the beverage cooling medium in the cooling loop and the beverage in the beverage line within the dispense font. The system may be adapted so that the entire flow of the beverage cooling medium may flow through the cooling loop or the cooling loop may be branched off from the cooling line/return cooling line so that at least a portion, but not necessarily all, of the beverage cooling medium flow may pass through the cooling loop.

The font preferably includes a condensation mechanism comprising a condensation plate and a condensation line. The condensation line is in thermal contact with the condensation plate and may be formed of or may branch off from the cooling loop, cooling line or return cooling line so that beverage cooling medium can flow through the condensation line. This allows cooling of the condensation plate to such an extent that condensation can form on the condensation plate thus providing a font which has aesthetic appeal.

Preferably, the dispense font further comprises the cooling medium dispense valve. In this manner, beverage can be dispensed from the beverage dispense valve and then beverage cooling medium e.g. ice slush can be dispensed from the cooling medium dispense valve into the same glass without having to make any significant movement of the glass.

In a second aspect, the present invention provides a method for cooling a beverage flowing through a beverage line from a beverage supply to a dispensation site, the beverage line passing through a conduit, and for dispensing a beverage cooling medium, the method comprising:

transporting beverage cooling medium from the beverage supply or from a second beverage supply through a cooling line inside the conduit thereby allowing heat exchange between the beverage cooling medium in the cooling line and the beverage in the beverage line, wherein the method further comprises dispensing the beverage cooling medium into a receptacle from a cooling medium dispense valve at the dispensation site.

By using a beverage cooling medium (e.g. a soft drink or alcoholic beverage cooling medium) in place of a water and/or glycol cooling medium, effective cooling of the beverage in the beverage line can be achieved without any risk of freezing of the beverage. The dispensing of the beverage cooling medium can either be carried out independently of any dispense of the beverage from the beverage dispense valve (i.e. so that the receptacle contains only beverage cooling medium) or the cooling medium can be dispensed in combination with beverage from the beverage dispense valve (i.e. so that the receptacle contains both beverage from the beverage dispense valve and beverage cooling medium). The combination dispense is especially preferred when the beverage cooling medium is supercooled or contains particles of frozen beverage.

Preferably the method comprises transporting and dispensing an alcoholic beverage such as beer, lager or cider as the beverage cooling medium. The beverage in the beverage line is also preferably beer, lager or cider and, in the combination dispense, the beverage and the beverage cooling medium is preferably the same.

Preferably, the method further comprises transporting the beverage cooling medium away from the dispensation site in a cooling return line when the cooling medium dispense valve is closed. Thus the method preferably involves pumping beverage cooling medium round a cooling circuit formed by the cooling line and the cooling return line to maximise the heat exchange between the beverage cooling medium and the beverage in the conduit which may be an insulated conduit such as a python.

Heat energy may be withdrawn from the beverage cooling medium in the cooling return line using a heat exchanger. This reduces/maintains the low temperature of the beverage cooling medium in the cooling return line so heat exchange can occur between the beverage cooling medium and the beverage in the beverage line as the beverage cooling medium is transported back through the conduit/python in the cooling return line in the opposite direction to the beverage cooling medium in the cooling line.

Alternatively, the method may comprise applying heat energy to the beverage cooling medium in the cooling return line using a heat exchanger. This may result in a temperature increase in the beverage cooling medium or it may result in at least partial defrosting of any frozen particles of beverage in the beverage cooling medium.

Preferably, the method comprises cooling the beverage cooling medium to below it freezing point at ambient atmospheric pressure. This provides a cooling medium which will be colder than the water cooling medium used in some known systems but which will not be as cold as the glycol cooling medium used in other known systems. This will result in effective cooling of the beverage in the beverage line without any risk of freezing.

The method may comprise generating a beverage cooling medium containing particles of frozen beverage. In some embodiments, the method may comprise generating an ice slush beverage cooling medium i.e. the volume fraction of frozen beverage particles is sufficiently high that the beverage cooling medium has a slush consistency. In other embodiments, the volume fraction of frozen beverage particles may be low enough that the beverage cooling medium is a free-flowing liquid with suspended frozen particles.

Alternative methods comprise supercooling the beverage cooling medium before transporting it though the cooling line. Typically, this involves cooling the beverage cooling medium at a pressure greater than ambient atmospheric pressure.

The method may further comprise storing cooled beverage cooling medium in a cooling medium reservoir and passing the beverage through the reservoir in a beverage line portion prior to pumping the beverage through the conduit/python. This effects cooling of the beverage prior to transport through the conduit/python.

Preferably, the method further comprises pumping the beverage cooling medium through a cooling loop in a dispense font at the dispensation site. The cooling loop will be in thermal contact with the beverage line in the dispense font thus allowing cooling of the beverage by heat exchange right up to the point of dispense.

Most preferably, the method further comprises pumping the beverage cooling medium through a condensation line in a/the dispense font at the dispensation site to cause formation of condensation on the dispense font.

In a third aspect, the present invention provides a system for cooling a beverage and dispensing a frozen particle-containing beverage, the system comprising;

a beverage line connectable to a beverage supply for transporting the beverage from the beverage supply though a conduit to a beverage dispense valve at a dispensation site;

a freezer apparatus for generating a frozen particle-containing beverage;

a cooling line in communication with the freezer apparatus for transporting the frozen particle-containing beverage through the conduit so as to allow heat exchange between the frozen particle-containing beverage in the cooling line and the beverage in the beverage line; and a frozen particle-containing beverage dispense valve in communication with the cooling line at the dispensation site.

In this system, firstly, the frozen particle-containing beverage (e.g. frozen particle containing soft drink or alcoholic beverage) acts as a cooling medium to cool beverage in the beverage line by heat exchange within the conduit (which is preferably an insulated conduit such as a python). Secondly, the frozen particle-containing beverage can be dispensed into a receptacle either alone or in combination with beverage from the beverage line. This provides a versatile system which combines cooling of a beverage with the ability to dispense frozen beverage in a single system.

In preferred embodiments, the system further comprises a cooling return line for transporting frozen particle-containing beverage away from the dispensation site. When the frozen particle-containing beverage dispense valve is closed, the full flow of the frozen particle-containing beverage passes through the return cooling line. When the frozen particle-containing beverage dispense valve is open, the whole flow of frozen-particle containing beverage may be dispensed from the open valve. Alternatively, a portion of the flow of frozen particle-containing beverage may be dispensed from the open valve, whilst the remaining proportion passes through the return cooling line. Thus the cooling line and return cooling line form a cooling circuit so that the frozen particle-containing beverage can be re-circulated. The return cooling line can pass through the conduit (with the frozen particle-containing passing in the opposite direction to the flow direction in the cooling line). In this case, a heat exchanger may be provided to cool the frozen particle-containing beverage in the return cooling line before it enters the conduit.

Alternatively, the cooling return line may pass through a heat exchanger adapted to apply heat energy to any frozen particle-containing beverage in the cooling return line to melt the frozen particles. This helps avoid degradation of the frozen particle-containing beverage. In this case, the cooling return line may or may not pass back through the conduit.

Preferably, the system includes an insulated conduit of the type known as a “python” which comprises a tubular sleeve formed of insulating plastics material. The length of the python is unlimited but, typically, will be between 3 and 300 meters. A length of around 30 meters is most typical. The cooling line and (optionally) the return cooling line preferably pass through the python close to its axial centre with the beverage line running coaxially with the cooling/cooling return lines. Alternatively, one or both of the cooling line and cooling return line could be off-set from the axial centre of the python.

The beverage line may be formed predominantly of standard piping e.g. 9.5 mm (⅜") o.d. piping. There may be more than one beverage line, each line being connectable to its respective beverage supply and extending through the conduit/python to the dispensation site.

The cooling line and cooling return line typically have a larger bore than the beverage line(s). The cooling line and cooling return line typically have an outer diameter of 15 mm. However, the cooling line and cooling return line could have a bore size comparable to that of the beverage line(s), e.g. they could have an outer diameter of 9.5 mm (⅜").

In preferred embodiments, the freezer apparatus is a scraped cylinder slush ice generator. Such a generator includes a refrigeration unit which cools a wetted surface which is continuously scraped to from a two phase mixture of small frozen particles suspended in liquid beverage. The volume fraction of the frozen particles can be varied such that the frozen particle-containing beverage cooling medium may be a free-flowing liquid suspending frozen beverage particles or it may be have a slush consistency. Preferably, the volume fraction of frozen particles is up to 40%; such a mixture is easily pumpable through the cooling line.

The freezer apparatus is connectable to the or to a second beverage supply. The each beverage supply may be a supply of soft drink or alcoholic beverage e.g. a keg/barrel of beer, lager or cider.

The system may further comprise a cooling medium reservoir for containing frozen particle-containing beverage generated by the freezer apparatus. The reservoir is preferably insulated and may be remote from the freezer apparatus. It may contain an agitator. The reservoir allows the system to damp out demand fluctuations and thus enables the freezer apparatus to be sized for the mean load rather than the peak load. The reservoir may be fed by the freezer apparatus, i.e. the reservoir stores frozen particle-containing beverage prior to its passage through the cooling line but, preferably, the reservoir is fed by the return cooling line, i.e. the reservoir stores frozen particle-containing beverage after its passage through the cooling line and return cooling line.

The beverage line preferably includes a beverage line portion passing through the reservoir so that the beverage in the beverage line is cooled by heat exchange with the frozen particle-containing beverage prior to passing through the conduit/python. Preferably, the beverage line portion is a coiled portion which can be immersed in the frozen particle-containing beverage in the reservoir. The amount of coil immersed can be varied to determine the extent of heat exchange and hence the extent of cooling of the beverage in the beverage line portion. If no cooling medium reservoir is provided, the beverage line portion may pass through a chiller such as an ice bank/water bath chiller.

The system may include a secondary cooler at or near the dispensation site (although it may be provided at any point between the point of connection of the beverage line to the beverage supply and the dispensation site). The secondary cooler may be a passive heat exchanger which, preferably, can be flooded with frozen particle-containing beverage from the cooling line. The passive heat exchanger preferably includes a cooling coil through which the beverage from the beverage line can flow to allow heat exchange between the beverage in the cooling coil and the frozen particle-containing beverage. Most preferably, the passive heat exchanger is as described in GB2417064.

Preferably, the beverage dispense valve is provided on a dispense font at the dispensation site. Most preferably, the dispense font comprises a cooling loop formed of the cooling line or the return cooling line for cooling/maintaining the temperature of the beverage by heat exchange between the frozen particle-containing beverage in the cooling loop and the beverage in the beverage line within the dispense font. The system may be adapted so that the entire flow of the frozen particle-containing beverage may flow through the cooling loop or the cooling loop may be branched off from the cooling line/return cooling line so that at least a portion, but not necessarily all, of the frozen particle-containing beverage flow may pass through the cooling loop.

The font preferably includes a condensation mechanism comprising a condensation plate and a condensation line. The condensation line is in thermal contact with the condensation plate and may be formed of or may branch off from the cooling loop, cooling line or return cooling line so that frozen particle-containing beverage can flow through the condensation line. This allows cooling of the condensation plate to such an extent that condensation can form on the condensation plate thus providing a font which has aesthetic appeal.

Preferably, the dispense font further comprises the frozen particle-containing dispense valve. In this manner, beverage can be dispensed from the beverage dispense valve and then frozen particle-containing beverage e.g. ice slush can be dispensed from the cooling medium dispense valve into the same glass without having to make any significant movement of the glass.

In a fourth aspect, the present invention provides a method for cooling a beverage flowing through a beverage line from a beverage supply to a beverage dispense valve at a dispensation site, the beverage line passing through a conduit, and for dispensing a frozen particle-containing beverage, the method comprising;

generating a frozen particle-containing beverage using a freezer apparatus;

transporting the frozen particle-containing beverage from the freezer apparatus through a cooling line in the conduit to a frozen particle-containing beverage dispense valve so as to allow heat exchange between the frozen particle-containing beverage in the cooling line and the beverage in the beverage line; and dispensing the frozen particle-containing beverage into a receptacle at the dispensation site.

By using a frozen particle-containing beverage cooling medium (e.g. frozen particle-containing soft drink or alcoholic beverage) in place of a water and/or glycol cooling medium, effective cooling of the beverage in the beverage line can be achieved without any risk of freezing of the beverage. The dispensing of the frozen particle-containing beverage can either be carried out independently of any dispense of the beverage from the beverage dispense valve (i.e. so that the receptacle contains only frozen particle-containing beverage) or the frozen particle-containing beverage can be dispensed in combination with beverage from the beverage dispense valve (i.e. so that the receptacle contains both beverage from the beverage line and frozen particle-containing beverage from the cooling line). The combination dispense is especially preferred when the frozen particle-containing beverage is an ice slush.

Preferably the method comprises transporting and dispensing an alcoholic beverage such beer, lager or cider containing particles of frozen beer, lager or cider respectively as the frozen particle-containing beverage. The beverage in the beverage line is also preferably beer, lager or cider and, in the combination dispense, the beverage and the frozen particle-containing beverage is preferably the same.

Preferably, the method further comprises transporting the frozen particle-containing beverage away from the dispensation site in a cooling return line when the frozen particle-containing beverage dispense valve is closed. Thus the method preferably involves pumping frozen particle-containing beverage around a cooling circuit formed by the cooling line and the cooling return line to maximise the heat exchange between the frozen particle-containing beverage and the beverage in the python.

Heat energy may be withdrawn from the frozen particle-containing beverage in the cooling return line using a heat exchanger. This reduces/maintains the low temperature of the frozen particle-containing beverage in the cooling return line so that heat exchange can occur between the frozen particle-containing beverage and the beverage in the beverage line as the frozen particle-containing beverage is transported back through the conduit (which may an insulated conduit such as a python) in the cooling return line in the opposite direction to the frozen particle-containing beverage in the cooling line.

Alternatively, the method may comprise applying heat energy to the frozen particle-containing beverage in the cooling return line using a heat exchanger. This may result in at least partial defrosting of the frozen particles of beverage in the frozen particle-containing beverage. This helps to avoid degradation of the frozen particle-containing beverage.

In some embodiments, the method may comprise generating a frozen particle-containing beverage with a volume fraction of frozen particles that is sufficiently high that the frozen particle-containing beverage has a slush consistency. In other embodiments, the volume fraction of frozen beverage particles may be low enough that the beverage cooling medium is a free-flowing liquid with suspended frozen particles.

The method may further comprise storing frozen particle-containing beverage in a cooling medium reservoir and passing the beverage through the reservoir in a beverage line portion prior to pumping the beverage through the conduit/python. This effects cooling of the beverage prior to transport through the conduit/python.

Preferably, the method further comprises pumping the frozen particle-containing beverage through a cooling loop in a dispense font at the dispensation site. The cooling loop will be in thermal contact with the beverage line in the dispense font thus allowing cooling of the beverage by heat exchange right up to the point of dispense.

Most preferably, the method further comprises pumping the frozen particle-containing beverage through a condensation line in a/the dispense font at the dispensation site to cause formation of condensation on the dispense font.

Preferred embodiments of the present invention will now be described, by way of example only, with reference to the accompanying drawings in which.

Figure 1:
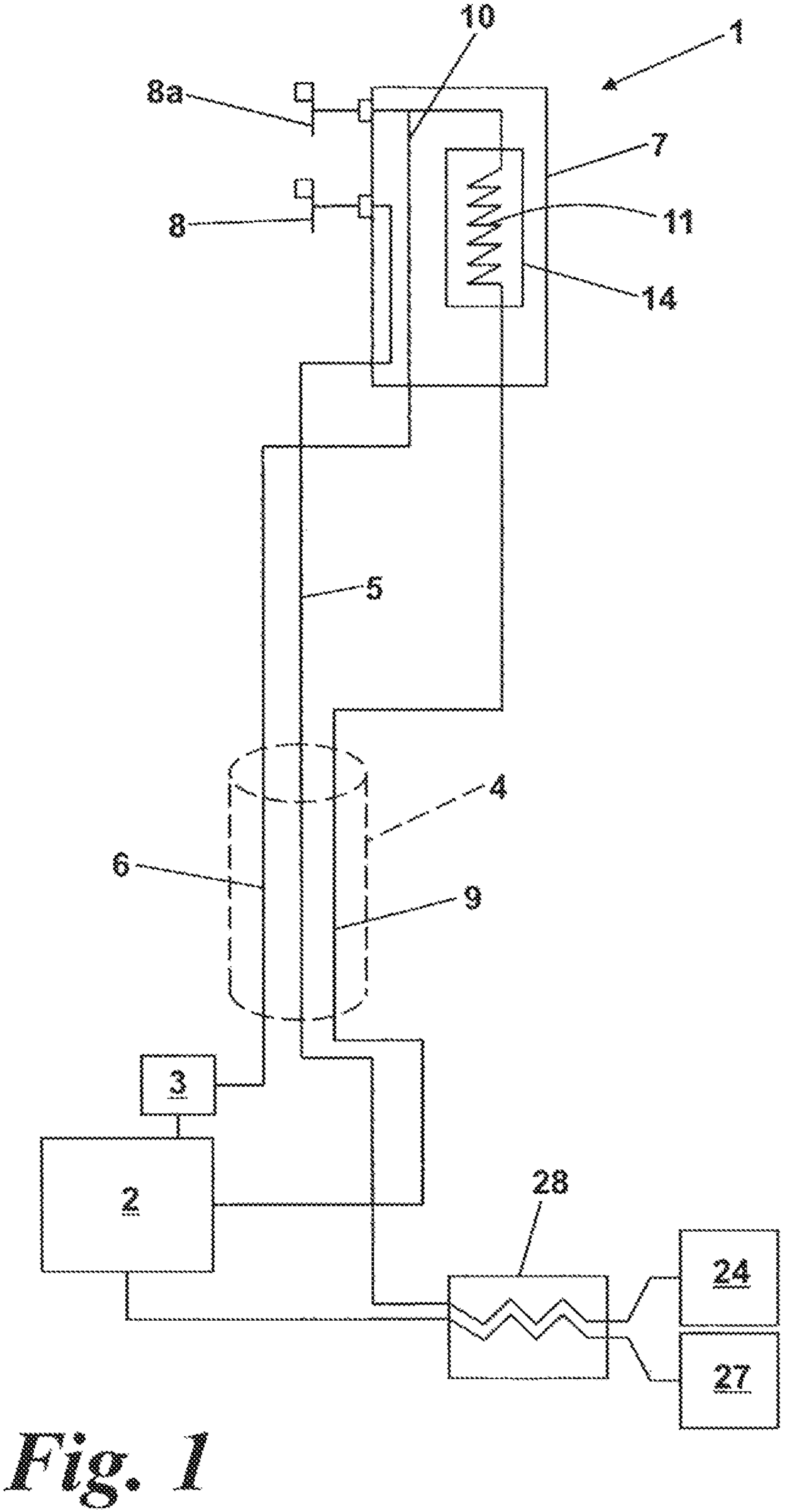
FIG. 1 shows a first preferred embodiment of the present invention.

FIG. 1 shows a system comprising a dispense font 1, a freezer apparatus 2, a pump 3, an insulated conduit 4, a beverage line 5, and a cooling line 6. The beverage line is connected to a beverage supply 24 and the cooling line 6 is connected to a second beverage supply 27 (although they could both be connected to a single beverage supply).

The dispense font 1 is located at a dispensation site, such as a bar area of a public house and includes a beverage dispense valve in a beverage dispense tap 8 and a beverage cooling medium/frozen particle-containing beverage dispense valve in a beverage cooling medium/frozen particle-containing beverage dispense tap 8*a*.

The freezer apparatus 2 comprises an ice generator which is a scraped wall ice generator. Such a generator includes a refrigeration unit which cools a wetted surface (wetted with beverage from the beverage supply 24) which is continuously scraped to form a frozen particle-containing beverage/beverage cooling medium. The volume of the frozen particles can be varied such that the frozen particle containing beverage/beverage cooling medium can be a free-flowing liquid suspending frozen particles (e.g. 1 to 20% volume fraction of frozen particles) or it can have a slush consistency (preferably up to 40% volume fraction ice).

The freezer apparatus is adapted to generate microscopic frozen particles. This small particle size is achieved by combination of a high flow rate of beverage through the freezer apparatus and scraping the wetted surface at a high frequency by means of a high speed auger motor, typically between 20 rpm and 200 rpm.

The system further comprises a chiller 28 which may be a known ice/water bath or flash chiller. Beverage in the beverage line and in the cooling line is initially cooled using the chiller. The beverage in the cooling line is typically cooled to less than 1° C. in the chiller 28.

The freezer apparatus 2 and chiller 28 are located at a remote site separated from the bar area; typically they are provided in a back room or cellar. The chiller 28 may be remote from the freezer apparatus 2.

The pump 3 is a centrifugal pump such as an MMP4 manufactured by March May. The pump is for pumping the cooling medium through the cooling line 6. The cooling line 6 is part of a cooling circuit comprising the cooling line 6 and a cooling return line 9. The cooling line and the return line have an outer diameter of 15 mm. Both the cooling line 6 and the return line 9 extend through the insulated conduit to/from the dispense font 1. The flow rate for the frozen particle-containing beverage/beverage cooling medium is typically 2 to 8 liters per minute.

Figure 2:
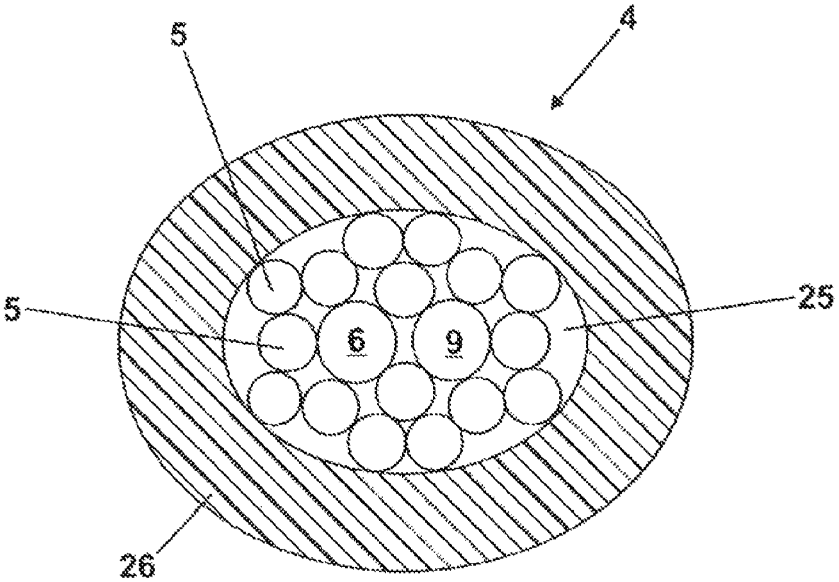
FIG. 2 shows a cross-section through an insulated conduit used in preferred embodiments of the present invention.

The insulated conduit 4 is of the type commonly known as a "python" and is shown in FIG. 2. The python comprises a conduit 25 in which runs the beverage line 5, the cooling line 6 and the cooling return line 9. An insulated sheath 26 provides the python with structural integrity and also helps to minimise heat transfer with the surroundings. The python is around 30 meters in length.

The python extends from the remote location to the dispensation site. For the sake of clarity, in FIG. 1, the python is not shown as extending the entire way between the freezer apparatus 2 and the dispense font 1. In practice, the python would extend for the whole distance.

A beverage line 5 having an outer diameter of 9.5 mm (3/8") passes from the beverage supply 24 (e.g. a storage vessel such as a keg or barrel) and through the chiller 28.

The number of beverage lines in the system can be varied depending on the number of dispense fonts that require connection. In the embodiment shown in FIG. 1, only a single beverage line 5 is shown for the sake of clarity.

After passing through the chiller 28, the beverage line continues through the python to the dispense font 1.

The dispense font 1 comprises a housing 7 which is mountable on a bar or similar surface visible to the customer and on which the beverage dispense tap 8 is mounted. The dispense tap 8 is connected to the beverage line 5. The beverage cooling medium/frozen particle-containing beverage tap **8*a* for dispensing beverage ice slush is also mounted on the dispense font 1**.

The dispense font 1 is further provided with a cooling loop 10 which is formed from the cooling line and which runs within the font housing 7 in close proximity to the beverage line 5 thus allowing heat transfer between the beverage ice slush in the cooling loop 10 and the beverage in the beverage line 5.

There is also a condensation mechanism comprising a coiled condensation line 11 formed from the return cooling line and a metal condensation plate 14, the condensation line 11 being in thermal contact with the condensation plate 14. The metal condensation plate 14 is formed on a surface of the font housing 7 which, in use, faces the customer so that a condensing surface is visible to the customer.

In use, the beverage is dispensed from the beverage dispense tap 8. The beverage is dispensed by means of a gas-pressurised system (not shown) or alternatively by a pumping mechanism. Beverage is passed from the beverage supply 24 e.g. a storage keg (or similar container) along the beverage line 5. The beverage passes through the chiller 28 where it is cooled to a temperature of around 0° C.

The beverage flows through the python 4 to the dispense font 1 at the dispensation site.

The pump 3 operates to pump beverage cooling medium/frozen particle containing beverage from the ice generator (freezer apparatus) 2 through the cooling line 6 to the beverage cooling medium/frozen particle-containing beverage dispense tap **8*a*. If the beverage cooling medium/frozen particle-containing beverage tap is opened, beverage cooling medium/frozen particle-containing beverage can be dispensed from the tap 8*a*. If the tap is closed, the beverage cooling medium/frozen particle-containing beverage is pumped through the cooling loop 10 and coiled condensation line 11 in the dispense font 1 and then to the freezer apparatus through the cooling return line 9**. The flow rate is between 4 and 8 l/min with a head of no more than 18 meters (although this can be increased if the length of the python is increased).

The frozen particle-containing beverage/beverage cooling medium pumped through the cooling line 6 including through the cooling loop 10 cools/maintains the low temperature of the beverage as it flows to the dispensation site. The frozen particle-containing beverage/beverage cooling medium pumped through the condensation line causes condensation to form on the condensation plate.

The frozen particle-containing beverage/beverage cooling medium can be dispensed from the beverage cooling medium/ frozen particle-containing beverage tap **8*a* into a vessel separate from the vessel into which the beverage is dispensed (from the beverage dispense tap 8). Alternatively, the frozen particle-containing beverage/beverage cooling medium is dispensed into the same vessel as the beverage. For example, a vessel may be partially filled e.g. two thirds filled with beverage from the beverage dispense tap and then the glass can be topped up with frozen particle-containing beverage/beverage cooling medium from the beverage cooling medium/frozen particle-containing beverage tap 8*a***. In other embodiments, the frozen particle-containing beverage/beverage cooling medium may be added to a vessel from the beverage cooling medium/frozen particle-containing beverage tap before or at the same time as beverage is added from the beverage dispense tap.

Figure 3:
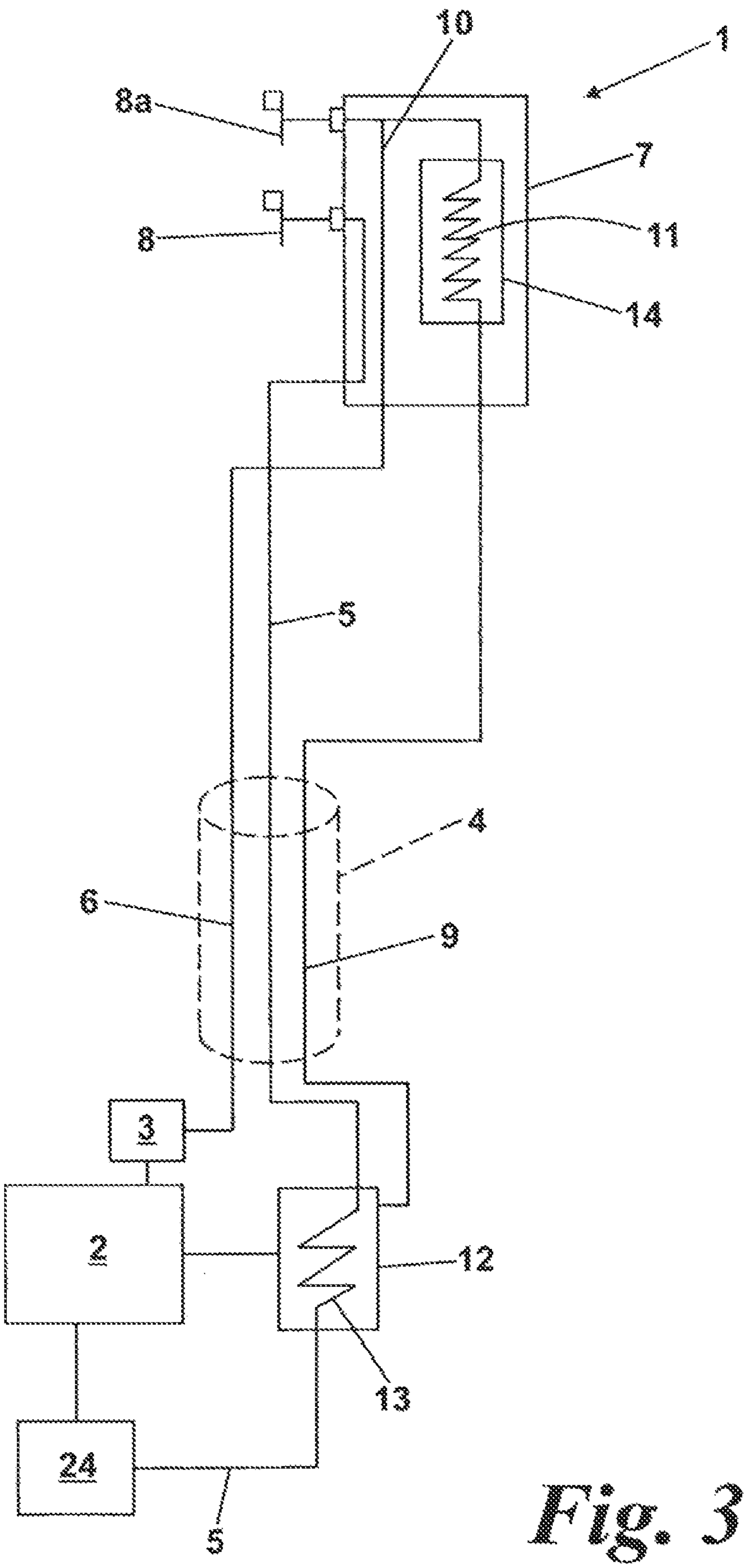
FIG. 3 shows a second preferred embodiment of the present invention.

FIG. 3 shows a second embodiment of the present invention. The system comprises a dispense font 1, a freezer apparatus 2, a pump 3, an insulated conduit 4, a beverage line, a cooling line, a cooling return line 9, a cooling loop and a condensation line/plate and these are as described above for the first embodiment (except where stated).

Both the beverage line and the cooling line are connected to a single beverage supply 24.

The freezer apparatus 2 is adapted to form an ice slush beverage i.e. a two phase mixture of about 40% small ice crystals suspended in liquid beverage.

The system further comprises a cooling medium reservoir 12, in which ice slush beverage from the freezer apparatus 2 is stored. The reservoir 12 is insulated and contains an agitator to ensure that the beverage ice slush remains homogenous.

The freezer apparatus 2 and reservoir 12 are located at a remote site separated from the bar area; typically they are provided in a back room or cellar. The reservoir 12 may be remote from the freezer apparatus 2.

The beverage line 5 having an outer diameter of 9.5 mm (3/8") passes from the beverage supply 24 (e.g. a storage vessel such as a keg or barrel) and through the reservoir 12. The beverage line 5 includes a beverage line portion 13 which is coiled and immersed in the beverage ice slush in the reservoir 12 to improve heat transfer between the beverage ice slush in the reservoir 12 and the beverage. The coiled beverage line portion 13 has an outer diameter of 7.9 mm (5/16") and an immersed length of 8.5 meters.

After passing through the reservoir 12, the beverage line continues through the python to the dispense font 1.

In use, the beverage is passed from the beverage supply 24 e.g. a storage keg (or similar container) along the beverage line 5. The beverage passes through the coiled beverage line portion 13 immersed in the beverage slush ice in the reservoir 12 where it is cooled to a temperature of around 0° C. by heat exchange with the beverage ice slush.

The beverage flows through the python 4 to the dispense font 1 at the dispensation site.

The pump 3 operates to pump beverage ice slush from the freezer apparatus 2 through the cooling line 6 to the beverage cooling medium/frozen particle-containing beverage dispense tap 8*a*. If the beverage cooling medium/frozen particle-containing beverage tap is opened, beverage ice slush can be dispensed from the tap 8*a*. If the tap is closed, the beverage ice slush is pumped through the cooling loop 10 and coiled condensation line 11 in the dispense font 1 and then to the reservoir 12 through the cooling return line 9. The flow rate is between 4 and 8 l/min with a head of no more than 18 meters (although this can be increased if the length of the python is increased).

The beverage ice slush pumped through the cooling line 6 including through the cooling loop 10 cools/maintains the low temperature of the beverage as it flows to the dispensation site. The beverage ice slush pumped through the condensation line causes condensation to form on the condensation plate.

The beverage ice slush can be dispensed from the beverage cooling medium/frozen particle-containing beverage tap 8*a* into a vessel separate from the vessel into which the beverage is dispensed (from the beverage dispense tap 8). Alternatively, the beverage ice slush is dispensed into the same vessel as the beverage. For example, a vessel may be partially filled e.g. two thirds filled with beverage from the beverage dispense tap and then the glass can be topped up with beverage slush from the beverage cooling medium/frozen particle-containing beverage tap 8*a*. In other embodiments, the beverage slush may be added to a vessel from the beverage cooling medium/frozen particle-containing beverage tap before or at the same time as beverage is added from the beverage dispense tap.

Figure 5:
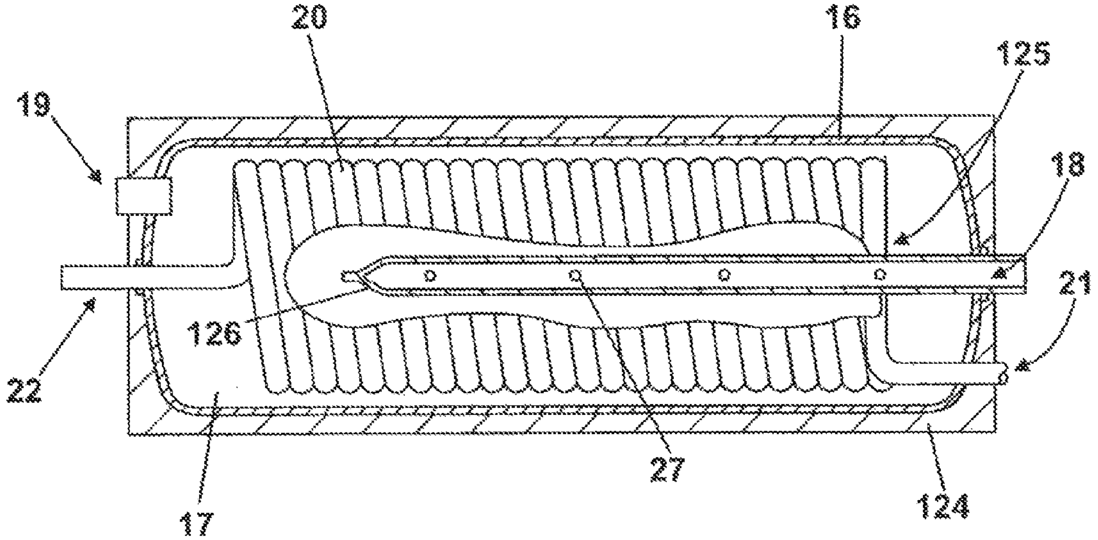
FIG. 5 shows a third preferred embodiment of the present invention.
Figure 4:
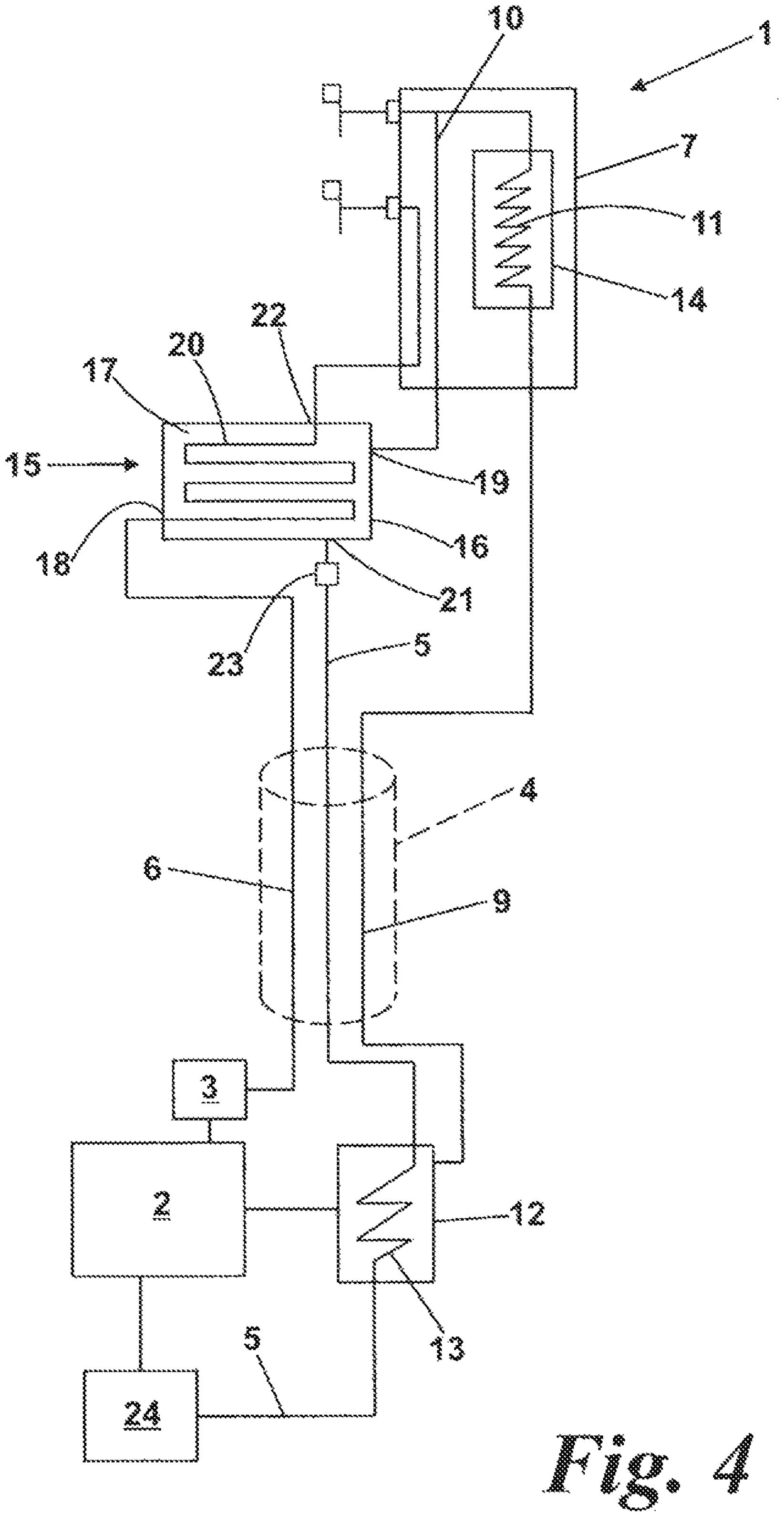
FIG. 4 shows the secondary cooler of the second preferred embodiment.

FIG. 4 shows a third embodiment of the present invention which is the same as the embodiment shown in FIG. 3 except that a secondary cooler 15 is provided. The secondary cooler 15 comprises a cooling pod (such as that described in GB2417064) which is shown in more detail in FIG. 5.

The cooling pod includes a housing 16 defining a cooling chamber 17. The housing 16 is surrounded by insulation 124 (for example expanded foam insulation) to minimise heat transfer between the cooling pod and the surroundings.

The cooling chamber 17 is provided with a beverage slush ice inlet 18 into which slush ice is pumped to flood the chamber and a beverage slush ice outlet 19 from which the beverage slush ice exits the cooling chamber to continue to the beverage cooling medium/frozen particle-containing beverage tap 8*a* on the dispense font 1. An elongated pipe 125 is connected to the beverage slush ice inlet 18. The pipe 125 has a closed end 126 distal to the beverage slush ice inlet and a number of holes 27 spaced along the length and around the circumference of the pipe 125.

A cooling coil 20 is provided within the cooling chamber between a beverage inlet 21 and a beverage outlet 22. The beverage line 5 which has an outer diameter of 9.5 mm (3/8") connects to the beverage inlet 21 and thus the cooling coil (which has a diameter of 7.9 mm (5/16")) through a coupling 23 and then continues from the beverage outlet 22 to the beverage dispense tap 8 on the dispense font 1.

The pipe 125 is located within the cooling coil 20 such that the beverage slush ice exiting the holes 27 impacts as a spray on the inside surface of the coil 20.

The cooling pod is located at the dispensation site. It may be located above or below bar level and may optionally be incorporated into the housing 7 of the dispense font 1.

The python 4 preferably extends either side of the cooling pod i.e. the python may be formed of two separate pieces, one piece running from the generator/freezing apparatus 2 to the cooling pod 15 and another piece extending from the cooling pod 15 to the dispense font 1 at the dispensation site.

The provision of the cooling pod allows the temperature of the beverage to be reduced even further, to around −1.5° C. as it exits the cooling pod. This results in an "in-glass" temperature of around 0° C.

Figure 6:
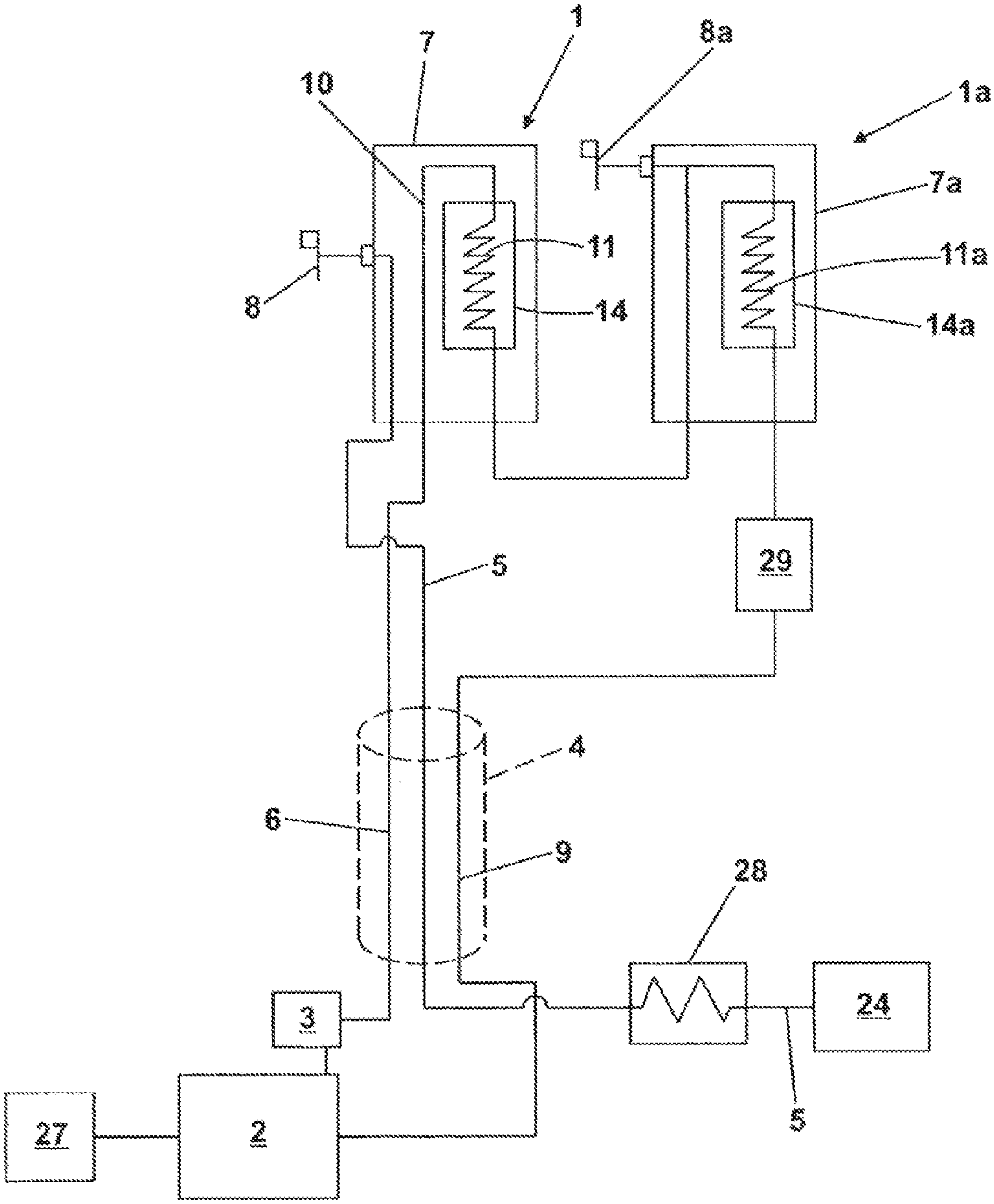
FIG. 6 shows a fourth preferred embodiment of the present invention.

FIG. 6 shows a fourth preferred embodiment of the present invention. The system comprises a first dispense font 1, a freezer apparatus 2, a pump 3, an insulated conduit 4, a beverage line 5, a cooling line 6, a cooling return line 9, a cooling loop, 10, a condensation line/plate 11/14, a chiller 28 and beverage supplies 24 and 27 and these are as described above for the first preferred embodiment unless otherwise indicated.

The beverage cooling medium/frozen particle-containing beverage tap 8*a* is provided on a second dispense font 1*a* located adjacent to the first dispense font 1 on the bar.

The pump 3 is used to pump the beverage cooling medium containing frozen particles through the cooling line 6 (where heat exchange between the beverage cooling medium containing frozen particles and the beverage in the beverage line 5 results in cooling/maintaining the cool temperature of the beverage) to the cooling line 10 in the dispense font 1 (so that heat exchange between the beverage cooling medium containing frozen particles and the beverage can continue up to the point of dispense) and then through the condensation line 11. After leaving the dispense font 1, the beverage cooling medium containing frozen particles is pumped to the second dispense font 1*a* to a beverage cooling medium dispense tap 8*a* where dispense of the beverage cooling medium containing frozen particles can occur. If the tap 8*a* is closed, the beverage cooling medium containing frozen particles continues on a path through a second condensation line 11*a* for forming condensation on the second condensation plate 14*a* on the dispense font body 7*a*.

After leaving the second dispense font 1a, the beverage cooling medium containing frozen particles passes through the return cooling line 9 through a heat exchanger 29 where heat energy is applied to the beverage cooling medium containing frozen particles such that the frozen particles melt, preferably without raising the temperature of the beverage cooling medium. The beverage cooling medium then passes back through the python to the freezer apparatus where it can be re-converted into the beverage cooling medium containing frozen particles.

The taps 8, 8*a* are provided on different fonts because it is envisaged that the beverage from the beverage line and the beverage cooling medium containing frozen particles from the cooling line will be dispensed independently i.e. into different glasses and hence the proximity of the taps is not essential. However, the taps could be provided on the same font if desired. In alternative embodiments, only a single beverage supply is provided and the beverage and beverage cooling medium containing frozen particles is the same.

Figure 7:
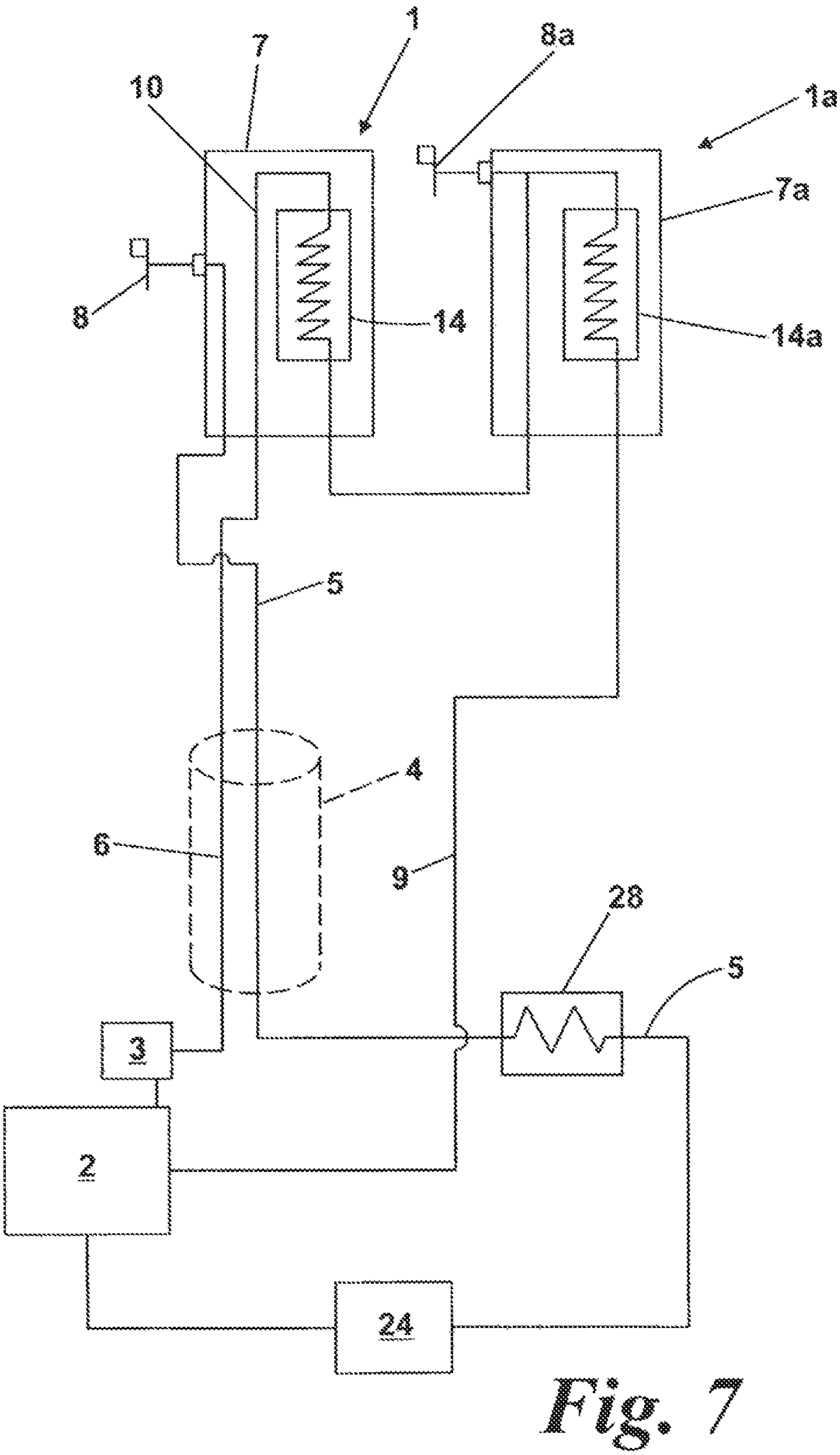
FIG. 7 shows a fifth preferred embodiment of the present invention.

FIG. 7 shows a fifth preferred embodiment which is similar to the first and fourth preferred embodiments. However, instead of providing a heat exchanger for applying heat energy to the beverage cooling medium containing frozen particles in the cooling return line (as in the fourth embodiment), no heat exchanger is provided and the return cooling passes back to the freezer apparatus externally of the python. Melting of the frozen particles in the beverage cooling medium will occur during the flow of the beverage cooling medium back to the freezer apparatus externally of the python. This helps maintain the quality of the re-circulated beverage cooling medium. Furthermore, a single beverage supply 24 feeds both the beverage line 5 and the freezer apparatus.

Figure 8:
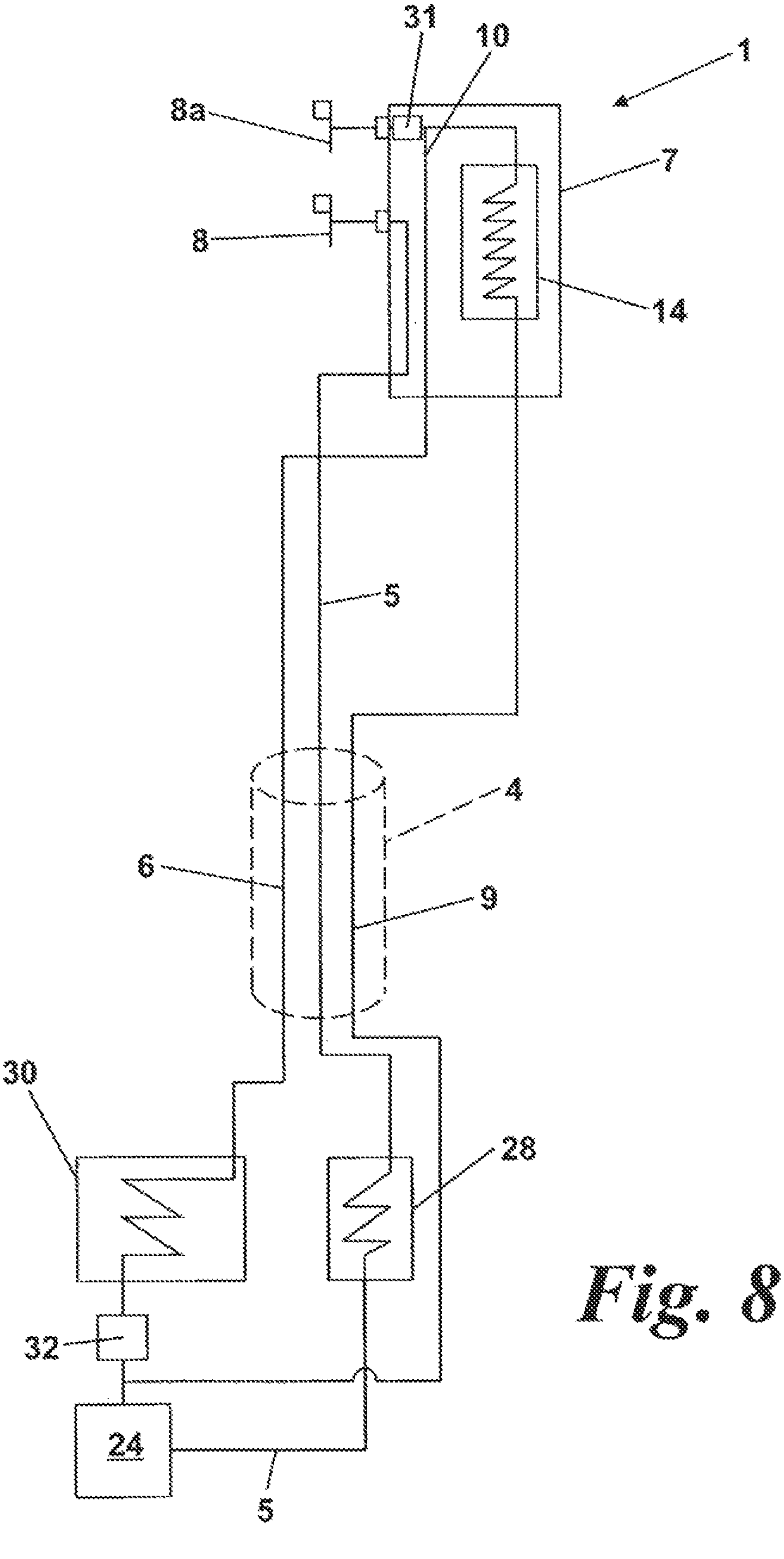
FIG. 8 shows a sixth preferred embodiment of the present invention.

FIG. 8 shows a sixth preferred embodiment in which the beverage cooling medium is supercooled. The system comprises a dispense font 1, an insulated conduit 4, a beverage line 5, a cooling line 6, a cooling return line 9, a cooling loop 10 and a condensation line/plate 11/14 and these are as described above for the first preferred embodiment unless otherwise indicated.

A single beverage supply 24 is provided to feed both the beverage line 5 and the cooling line 6 although separate beverage supplies could be provided if desired.

Beverage in the beverage line 5 is initially cooled prior to transport along the python using a chiller 28 which may be a known ice/water bath or flash chiller.

Beverage cooling medium from the beverage supply is pressurised using a pump 32 and then cooled by passing through a coil in a chiller 30. The beverage cooling medium is cooled to a temperature below which it would freeze at normal atmospheric pressure but above the temperature at which it freezes at the elevated pressure (caused by the pump).

The supercooled beverage cooling medium then passes along the cooling line in the python and heat transfer between the beverage cooling medium in the cooling line 6 and beverage in the beverage line 5 and cooling loop 10 cools/maintains the low temperature of the beverage.

The beverage is then dispensed from the beverage dispense tap 8 at the dispense font. The supercooled beverage cooling medium may be dispensed from the beverage cooling medium dispense tap 8*a* which may be on the same dispense font 1 as the beverage dispense tap 8 or may be provided on a second dispense font (not shown).

Prior to dispense of the supercooled beverage cooling medium, the beverage cooling medium passes through a pressure reducer 31, e.g. a low restrictor, to decrease the pressure of the beverage thereby avoiding frothing of the dispense beverage cooling medium. The supercooled beverage cooling medium may be dispensed into the same vessel as the beverage (dispensed from the beverage dispense tap 8) or it may be dispensed into another vessel.

When the beverage cooling medium dispense tap 8*a* is closed, the supercooled beverage cooling medium is re-circulated back to the pump 32 via the condensation line 11 and the return cooling line 9.

The embodiments described above are given by way of illustration only and various modifications will be apparent to the person skilled in the art. For example, in the first, second, third, fifth or sixth embodiments, a heat exchanger may be provided to cool the beverage cooling medium in the return cooling line before it passes back through the python. Furthermore, in the second, third, fifth and sixth embodiments, two beverage supplies may be provided rather than the beverage line and cooling line both being supplied from a single beverage supply. Similarly, in the first and fourth embodiments, a single beverage supply may be provided rather than two separate supplies. The secondary cooler of the third embodiment may be incorporated into the first, second or fourth to sixth embodiments, two fonts can be provided (as in the fourth and fifth embodiments) in the first to third and sixth embodiments. Similarly, the fourth and fifth embodiments may have only a single font.

The invention claimed is:

1. A system for dispensing a cooled beverage, the system comprising:

a beverage line connectable to a beverage supply at a remote location at least a plurality of meters from a dispensing site, for transporting beverage from the beverage supply through a conduit to a beverage dispense valve at a dispensation site; and a cooling line for transporting a cooling medium through the conduit so as to allow heat exchange between the cooling medium in the cooling line and the beverage in the beverage line;

wherein the cooling line is connectable to the beverage supply, or to a second beverage supply to extend from a remote location at least a plurality of meters from a dispensing site, such that the cooling medium is a beverage cooling medium;

a slush ice generator for cooling the beverage cooling medium, proximate the remote location, to below its freezing point to form ice particles of frozen beverage at ambient atmospheric pressure;

a cooling return line extending from the dispensing site to the means for cooling; and wherein the system further comprises a cooling medium dispense valve, in communication with the cooling line at the dispensation site, for dispensing the beverage cooling medium.

2. The system according to claim 1, wherein the cooling return line is configured for transporting beverage cooling medium away from the dispensation site when the cooling medium dispense valve is closed.

3. The system according to claim 1, wherein the cooling return line passes through a heat exchanger adapted to withdraw heat energy from any beverage cooling medium in the cooling return line.

4. The system according to claim 1, wherein the cooling return line passes through a heat exchanger adapted to apply heat energy to any beverage cooling medium in the cooling return line.

5. The system according to claim 1, further comprising a cooling apparatus adapted to supercool the beverage cooling medium.

6. The system according to claim 5, wherein the cooling apparatus comprises a chiller and a cooling medium pressurizer and wherein the system further comprises a pressure reducer at or adjacent the cooling medium dispense valve.

7. The system according to claim 1, further comprising a cooling medium reservoir for containing beverage cooling medium generated by the freezer or cooling apparatus and wherein the beverage line includes a beverage line portion passing through the reservoir.

8. The system according to claim 1, wherein the beverage dispense valve is provided on a dispense font at the dispensation site and wherein the dispense font comprises a cooling loop formed of the cooling line, or the return cooling line, for forming condensation on the dispense font.

9. The system according to claim 8, wherein the dispense font further comprises the cooling medium dispense valve.

10. The system of claim 1, further comprising:

a thermally insulated beverage python containing at least the first beverage line and the cooling line;

the slush ice generator connectable to the cooling line in the python, for transporting the frozen particle-containing beverage through the python so as to allow heat exchange between the frozen particle-containing beverage in the cooling line and the beverage in the first beverage line; and a frozen particle-containing beverage dispense valve in communication with the cooling line at the dispensation site.

11. The system according to claim 10, wherein the cooling return line passes through a heat exchanger adapted to withdraw heat energy from any frozen particle-containing beverage in the cooling return line.

12. The system according to claim 10, wherein the cooling return line passes through a heat exchanger adapted to apply heat energy to any frozen particle-containing beverage in the cooling return line.

13. The system according to claim 10, wherein the freezer apparatus is a scraped cylinder slush ice generator.

14. The system according to claim 10, further comprising a cooling medium reservoir for containing frozen particle-containing beverage generated by the freezer apparatus and wherein the beverage line includes a beverage line portion passing through the reservoir.

15. The system according to claim 10, wherein the beverage dispense valve is provided on a dispense font at the dispensation site and wherein the dispense font comprises a cooling loop formed of the cooling line or the return cooling line for cooling/maintaining the temperature of the beverage and/or a condensation mechanism including a condensation line formed of the cooling line or the return cooling line for forming condensation on the dispense font.

16. The system according to claim 15, wherein the dispense font further comprises the frozen particle-containing beverage dispense valve.

17. The system of claim 1, wherein the means for cooling the beverage cooling medium include at least one of a heat exchanger; a freezer apparatus; a cooling apparatus; a scraped cylinder slush ice generator; a refrigeration unit; an ice bath; a water bath; a chiller, a cooling medium pressurizer, and a pressure reducer; and a passive heat exchanger.

18. The system of claim 1, wherein the second beverage supply to which the cooling line is connected is located at least a plurality of meters from the dispensation site.

19. The system of claim 1, wherein the first and second beverages are the same beverage each transported at different temperatures.

20. A method for cooling a first beverage flowing through a first beverage line from a first beverage supply to a dispensation site, the first beverage line passing through a conduit, the method comprising:

cooling a second beverage supplied from a second beverage supply using a slush ice generator, the first and second beverage supply located a at least a plurality of meters from the dispensation site, to form a beverage cooling medium of particles of frozen beverage at ambient atmospheric pressure, the cooling performed at a cooling site at least a plurality of meters from the dispensation site;

transporting the beverage cooling medium from the cooling site, through a cooling line and a return cooling line inside the conduit, thereby allowing heat exchange between the beverage cooling medium in the cooling line and the beverage in the beverage line and dispensing the beverage cooling medium into a receptacle from a cooling medium dispense valve at the dispensation site.

21. The method according to claim 20, wherein the beverage and/or beverage cooling medium is beer, lager or cider.

22. The method according to claim 20, further comprising dispensing the beverage from the beverage dispense valve into the receptacle.

23. The method according to claim 20, further comprising transporting the beverage cooling medium away from the dispensation site in a cooling return line when the cooling medium dispense valve is closed.

24. The method according to claim 23, further comprising withdrawing heat energy from the beverage cooling medium in the cooling return line using a heat exchanger.

25. The method according to claim 23, further comprising applying heat energy to the beverage cooling medium in the cooling return line using a heat exchanger.

26. The method of claim 23, wherein the beverage cooling medium is selectively transported back to the cooling site.

27. The method according to claim 20, comprising supercooling the beverage cooling medium before transporting it though the cooling line.

28. The method according to claim 20, further comprising pumping the beverage cooling medium through a cooling loop in a dispense font at the dispensation site.

29. The method according to claim 20, further comprising pumping the beverage cooling medium through a condensation line in a/the dispense font at the dispensation site.

30. A method for cooling and dispensing a beverage , the method comprising:

generating a frozen particle-containing beverage using a slush ice generator;

transporting the frozen particle-containing beverage from the freezer apparatus through a cooling line, and a return cooling line, in a beverage python conduit having a length of a plurality of meters to a frozen particle-containing beverage dispense valve located at least a plurality of meters from the freezer apparatus, so as to allow heat exchange between the frozen particle-containing beverage in the cooling line and the beverage in the beverage line; and dispensing the frozen particle-containing beverage into a receptacle at the dispensation site.

31. The method according to claim 30, wherein the beverage and/or the frozen particle-containing beverage is beer, lager or cider.

32. The method according to claim 30, further comprising dispensing the beverage from the beverage dispense valve into the receptacle.

33. The method according to claim 30, further comprising transporting frozen particle-containing beverage away from the dispensation site in a cooling return line within the python when the frozen particle-containing beverage dispense valve is closed.

34. The method according to claim 33, further comprising withdrawing heat energy from the frozen particle-containing beverage in the cooling return line using a heat exchanger.

35. The method according to claim 33, further comprising applying heat energy to the frozen particle-containing beverage in the cooling return line using a heat exchanger.

36. The method according to claim 30, further comprising pumping the frozen particle-containing beverage through a cooling loop in a dispense font at the dispensation site.

37. The method according to claim 30, further comprising pumping the frozen particle-containing beverage through a condensation line in a dispense font at the dispensation site.

38. A system for dispensing a cooled beverage, the system comprising:

a beverage line connectable to a beverage supply at a location remote from a dispensing site, for transporting beverage from the beverage supply through a conduit to a beverage dispense valve at a dispensation site; and a cooling line for transporting a cooling medium through the conduit so as to allow heat exchange between the cooling medium in the cooling line and the beverage in the beverage line;

wherein the cooling line is connectable to the beverage supply, or to a second beverage supply, such that the cooling medium is a beverage cooling medium;

means for cooling the beverage cooling medium, proximate the remote location, to below its freezing point at ambient atmospheric pressure; and wherein the system further comprises a cooling medium dispense valve, in communication with the cooling line at the dispensation site, for dispensing the beverage cooling medium; and wherein the first and second beverages are the same beverage, the beverage cooling medium transported at a colder temperature than the temperature at which the first beverage is transported.

* * * * *

UNITED STATES PATENT AND TRADEMARK OFFICE

CERTIFICATE OF CORRECTION

PATENT NO. : 8,584,897 B2
APPLICATION NO. : 12/678924
DATED : November 19, 2013
INVENTOR(S) : Robert David John Belcham It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 683 days.

Signed and Sealed this
Twenty-second Day of September, 2015

Michelle K. Lee
*Director of the United States Patent and Trademark Office*